March 27, 1934.　　E. L. CECIL ET AL　　1,952,657
CALIPER
Filed Dec. 5, 1931
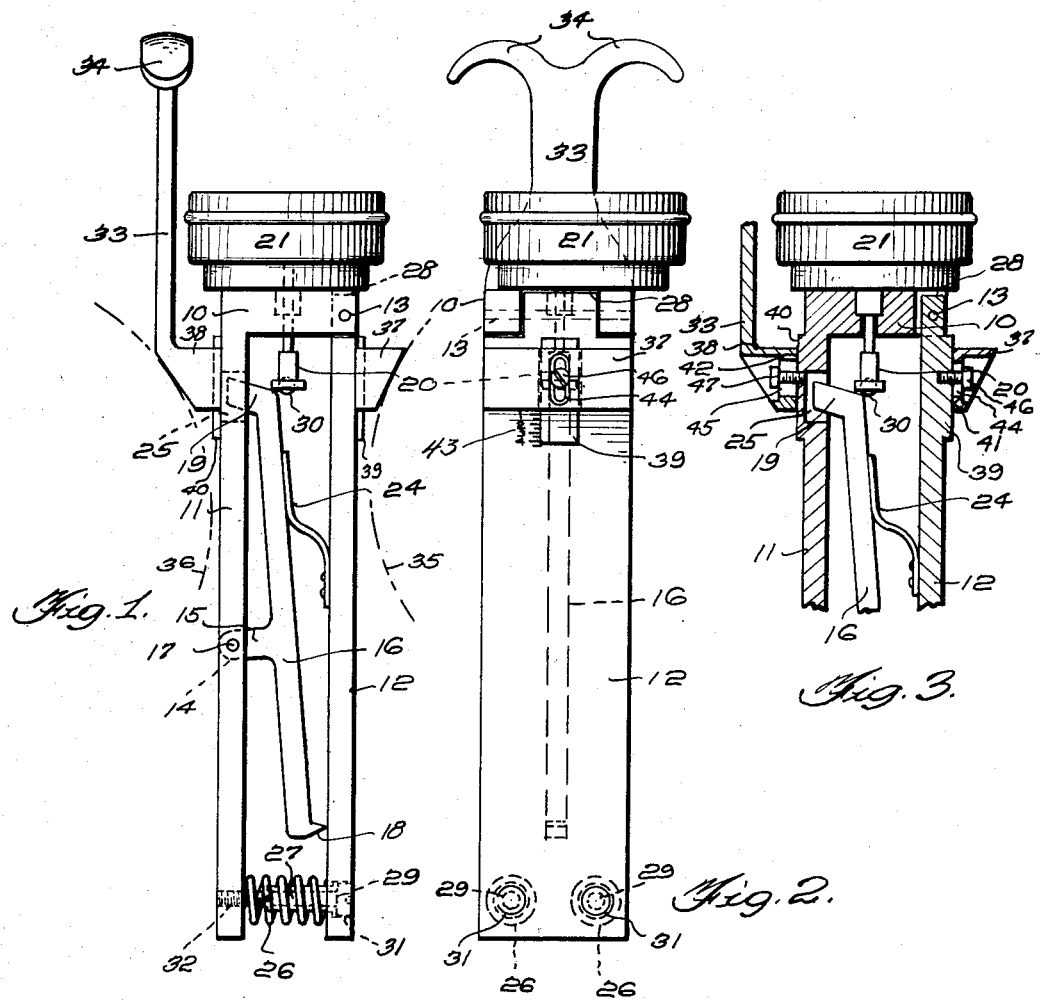
Inventors
Eugene L. Cecil and
John J. Callahan,
By
Attorney Patented Mar. 27, 1934

1,952,657

UNITED STATES PATENT OFFICE 1,952,657

CALIPER

Eugene L. Cecil and John J. Callahan, Washington, D. C.

Application December 5, 1931, Serial No. 579,296

8 Claims. (Cl. 33—148)

This invention is for a measuring instrument and provides a direct reading caliper of the pivoted leg type adapted to the accurate spacing of two objects, such for instance, as printing press cylinders, from each other.

The particular field of use for the device is in accurately determining the clearance between two machine elements, such as the plate cylinder and blanket cylinder of a printing press of the type commonly used in the press rooms of newspapers.

While the device has a wide range of uses in different fields it will be described in the following specification as applied to the cylinders of a printing press for accurately spacing the cylinders in such manner as to provide the proper clearance between the cylinders for imparting to a strip of news print paper passing between the printing plate supported by the plate cylinder and the blanket surrounding the blanket cylinder to imprint on the strip of news print paper a clear, even and uniform reproduction in ink of the matter typed on the plate.

The device is so constructed as to confine its accuracy within one ten-thousandth of an inch, and is yet sturdy and will withstand hard usage without injury thereto or endangering its accuracy as a measuring instrument of fineness.

It has long been a tedious and vexatious operation to pressmen to properly space the plate cylinder of a printing press with relation to the blanket carried by the blanket cylinder in order to obtain the proper bearing of the typed plate on the surface of the strip of news print paper passing between the typed plate and the blanket.

It has been the common practice of newspaper pressmen to make these cylinder adjustments by the use of wedges for moving the plate cylinder toward or away from the blanket cylinder and retaining the cylinders in their adjusted relation, using various kinds of measuring devices to determine the clearance between the cylinders which is an awkward and time-consuming operation and of necessity, due to such a crude method, results in maladjustment of the cylinders, all of which objections are readily overcome by the use of the caliper embodying the invention.

The primary object of the invention is to provide a measuring device in the form of a sensitive caliper having a visible indicator which will instantly indicate any variance from a predetermined distance between the cylinders of a printing press.

A further object of the invention is to provide a measuring instrument of the character indicated that will be readily adjustable to a desired measurement and secured in the adjusted position which position will be plainly indicated on the indicator.

The invention will be hereinafter fully set forth and particularly pointed out in the claims.

In the accompanying drawing:

Figure 1 is a side elevation of the invention.

Fig. 2 is a side elevation, taken at right angles to Fig. 1.

Fig. 3 is a section of Fig. 1 partly broken away and showing the indicator casing in elevation.

Fig. 4 is a top plan view of the indicator.

Like reference characters indicate like parts throughout the several figures of the drawing.

Reference character 10 indicates the head of the caliper having a depending leg 11 which is preferably made integral with the head 10. Cooperating leg 12 which is spaced from leg 11, and preferably of duplicate dimensions, is hingedly related to the opposite side of head 10, as by pivot 13. Leg 11 is recessed as at 14 for pivotally receiving lug 15 of actuating lever 16 as at 17. Lever 16 is provided at its lower extremity with finger 18 for contacting with the inner face of hinged leg 12 for rocking the lever on its pivot 17 when the free ends of legs 11 and 12 are forced toward each other. Lever 16 has at its inner end an angular outwardly extending portion forming a beveled or cam-faced shoe 19 for contacting with anti-friction roller 30 journaled in the lower extremity of pin 20 which extends upwardly into the indicator casing 21 and is for the purpose of actuating the indicator mechanism to cause the indicator finger 22 to move over the graduated scale 23 for registering thereon the movement of legs 11 and 12 with relation to each other.

Leaf spring 24 is secured to the inner face of leg 12 at a point intermediate the lever pivot 17 and the head 10 with its free end exerting pressure against the lever for forcing the shoe 19 into the recess 25 formed in leg 11 and relieving pressure of the shoe on pin 20 of the indicator mechanism, thereby permitting the indicator finger 22 to assume its normal position.

Helical springs 26 surrounding sleeves 27 are interposed between legs 11 and 12 at a point adjacent their lower ends for forcing the lower free end of leg 12 outwardly and away from the free end of leg 11 for effecting the seating of shoe 19 within recess 25 of leg 11 under the action of leaf spring 24. Head 10 is recessed as at 28 for providing for pivotally mounting leg 12 under the action of springs 26 surrounding sleeves 27.

Sleeves 27 are secured in recesses 31 in leg 12 which recesses form a continuation of the sleeves 27, and are of such dimensions as to provide for free reciprocal movement of the heads of the screws 29 therewithin when leg 12 is rocked on its pivot 13. Screws 29 pass through the sleeves 27 and are in screw-threaded engagement with the internally screw-threaded bore 32 in leg 11 and provide adjusting means for adjusting leg 12 with relation to leg 11. From the structure just described it will be readily seen that leg 12 can be readily adjusted with relation to leg 11 in any predetermined adjustment by the rotation of screws 29. As the ultimate object of the invention is to provide a caliper which will accurately indicate the exact clearance between the type plate cylinder and the blanket cylinder of a printing press, it is essential that the leg 11 being vertical to a horizontal line drawn through the axis and perpendicular thereto of cylinders 35 and 36 in order to obtain an exact measurement between the circumferential faces of the cylinders and as the plate cylinders and blanket cylinders of printing presses are not of standardized dimensions, truing blocks 37 and 38 are provided for limiting the movement of legs 11 and 12 inwardly between the cylinders 35 and 36 truing leg 11 when applying the caliper. Legs 11 and 12 have keys 39 and 40 extending outwardly from the outer faces thereof which have cooperation with key-ways 41 and 42, respectively formed in the inner faces of the blocks 37 and 38. Legs 11 and 12 are provided on their outer faces with scales 43 for registering with the bottom faces of the blocks when the legs 11 and 12 are inserted between the typed plate cylinder and the blanket cylinder with the bevel faces of the blocks 37 and 38 resting on the circumferential faces of the respective cylinders for so adjusting the bearing point of the finger 18 on leg 12 as to cause it to register with a line drawn through the axes of the typed plate cylinder 35 and the blanket cylinder 36. Blocks 37 and 38 are provided in their outer faces with elongated slots 44 and 45 respectively, for the insertion therethrough of set screws 46 and 47 respectively, which screws have screw-threaded engagement with keys 39 and 40 respectively, for locking the blocks in adjusted position to accommodate the calipers to cylinders of different dimensions. Arm 33 terminating in finger grips 34 is provided for convenience in applying the caliper between the printing press cylinders.

Having thus explained the nature of the invention and described an operative manner of constructing and using the same, although without attempting to set forth all of the forms in which it may be made, or all of the forms of its use, what is claimed is:

1. A caliper comprising a head, two spaced apart legs extending from the head, springs interposed between the legs, a lever pivotally related at its approximate center to one of the legs and contacting with one of its ends with the other of the legs and a shoe carried by the other of the ends of the lever, the first-named leg having a recess therein and a spring interposed between the second-named leg and the lever for forcing the shoe within the recess.

2. A caliper comprising two spaced apart relatively movable legs, a sleeve interposed between the legs, a spring surrounding the sleeve and exerting outward pressure upon the legs, and a screw passing through one of the legs and the sleeve and in screw-threaded engagement with the other of the legs.

3. A measuring instrument comprising a head, a recessed leg depending therefrom and rigidly affixed thereto, a second leg pivotally related to the head and spaced from the rigidly affixed leg, an actuating lever terminating in a shoe at one of its ends and contacting with the pivoted leg at the other of its ends, said leg being pivoted to the affixed leg and within the recess, and an indicator operating means in alinement with the movement of the shoe.

4. A measuring instrument comprising a head, a depending leg rigidly affixed thereto and being recessed intermediate its ends, a second leg pivotally related to the head and in spaced relation to the rigidly affixed leg, an actuating lever having a shoe at one of its ends and a portion pivotally seated in the recess, said affixed leg having a second recess spaced from the first-named recess and in alinement with the shoe, and a spring intermediate the actuating lever and the pivoted leg for rocking the lever on its pivot.

5. A caliper comprising a head, two normally spaced apart parallel legs extending from the head sleeves carried by one of the legs, one of said legs being integral with the head, the other of said legs being pivoted thereto and springs interposed between the legs and surrounding the sleeves for exerting outward pressure on the pivoted leg and adjustable limiting means passing through said sleeves and engaging each leg.

6. A caliper for spacing cylinders of different diameters comprising a head, two spaced apart legs depending from the head, a truing block slidably related to each of the legs and a graduated scale on each of the legs for registering with the blocks.

7. A caliper for spacing cylinders of different diameters comprising a head, two spaced apart legs depending from the head, one of said legs being movable with relation to the other of said legs, adjustable truing blocks carried by the legs and means for indicating the extent of movement of the movable leg.

8. A caliper comprising a head, a leg integral therewith, a second leg pivoted to the head and spaced from the integral leg, an indicator operating lever provided with a bevelled cam surface at one of its ends for operating an indicator and pivotally related to the integral leg, a spring exerting pressure on the lever at a point intermediate the pivot and the head, and means for limiting the movement of the movable leg.

EUGENE L. CECIL.
JOHN J. CALLAHAN.